United States Patent
Magarida et al.

(10) Patent No.: US 10,556,583 B2
(45) Date of Patent: Feb. 11, 2020

(54) VEHICLE CONTROL APPARATUS

(71) Applicant: TOYOTA JIDOSHA KABUSHIKI KAISHA, Toyota-shi, Aichi-ken (JP)

(72) Inventors: Naofumi Magarida, Shizuoka-ken (JP); Shinya Sannodo, Susono (JP); Yuichi Sakai, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 237 days.

(21) Appl. No.: 15/724,340

(22) Filed: Oct. 4, 2017

(65) Prior Publication Data

US 2018/0118195 A1    May 3, 2018

(30) Foreign Application Priority Data

Nov. 2, 2016 (JP) .................................. 2016-214934

(51) Int. Cl.
| | |
|---|---|
| *B60W 20/40* | (2016.01) |
| *B60L 58/12* | (2019.01) |
| *B60L 50/16* | (2019.01) |
| *B60L 50/61* | (2019.01) |
| *B60W 10/06* | (2006.01) |
| *B60W 10/08* | (2006.01) |
| *B60W 30/06* | (2006.01) |

(52) U.S. Cl.
CPC ............ *B60W 20/40* (2013.01); *B60L 50/16* (2019.02); *B60L 50/61* (2019.02); *B60L 58/12* (2019.02); *B60W 10/06* (2013.01); *B60W 10/08* (2013.01); *B60W 30/06* (2013.01); *Y02T 10/6217* (2013.01); *Y02T 10/7005* (2013.01); *Y02T 10/705* (2013.01); *Y02T 10/7044* (2013.01); *Y02T 10/7077* (2013.01); *Y10S 903/905* (2013.01); *Y10S 903/93* (2013.01)

(58) Field of Classification Search
None
See application file for complete search history.

(56) References Cited

U.S. PATENT DOCUMENTS

| | | | | |
|---|---|---|---|---|
| 8,229,615 | B2 * | 7/2012 | Sakamoto | B60K 6/445 701/22 |
| 9,527,502 | B1 * | 12/2016 | Park | B60W 20/10 |

(Continued)

FOREIGN PATENT DOCUMENTS

| | | | | |
|---|---|---|---|---|
| JP | 2004147460 A | * | 5/2004 | B60L 1/003 |
| JP | 2008-247252 A | | 10/2008 | |

(Continued)

*Primary Examiner* — Christian Chace
*Assistant Examiner* — Amelia J. I. Vorce
(74) *Attorney, Agent, or Firm* — Sughrue Mion, PLLC

(57) ABSTRACT

A vehicle control apparatus including an assisting device for performing a parking assist operation and a controlling device for performing a first control operation that controls charging an electric power storage by using an output of an engine if an amount of the stored electric power is smaller than a first threshold value. The controlling device performs a second control operation for putting the engine into a stopping state before a moving start time at which the vehicle starts to move after an assist start time and forbidding the engine from being started after the moving start time if the amount of the stored electric power at a timing before the moving start time is larger than a second threshold value.

5 Claims, 9 Drawing Sheets

(56) References Cited

U.S. PATENT DOCUMENTS

| | | | | |
|---|---|---|---|---|
| 9,689,485 B1* | 6/2017 | Zhao | ............... | F16H 48/36 |
| 2009/0277701 A1* | 11/2009 | Soma | ............... | B60K 6/445 |
| | | | | 180/65.25 |
| 2015/0019057 A1* | 1/2015 | Morisaki | ............... | B60L 7/18 |
| | | | | 701/22 |
| 2018/0050686 A1* | 2/2018 | Atluri | ............... | B60K 6/387 |
| 2018/0208178 A1* | 7/2018 | Owen | ............... | B60W 50/0097 |

FOREIGN PATENT DOCUMENTS

| | | |
|---|---|---|
| JP | 2008279980 A | 11/2008 |
| JP | 2010-111188 A | 5/2010 |

* cited by examiner

[FIG. 1]
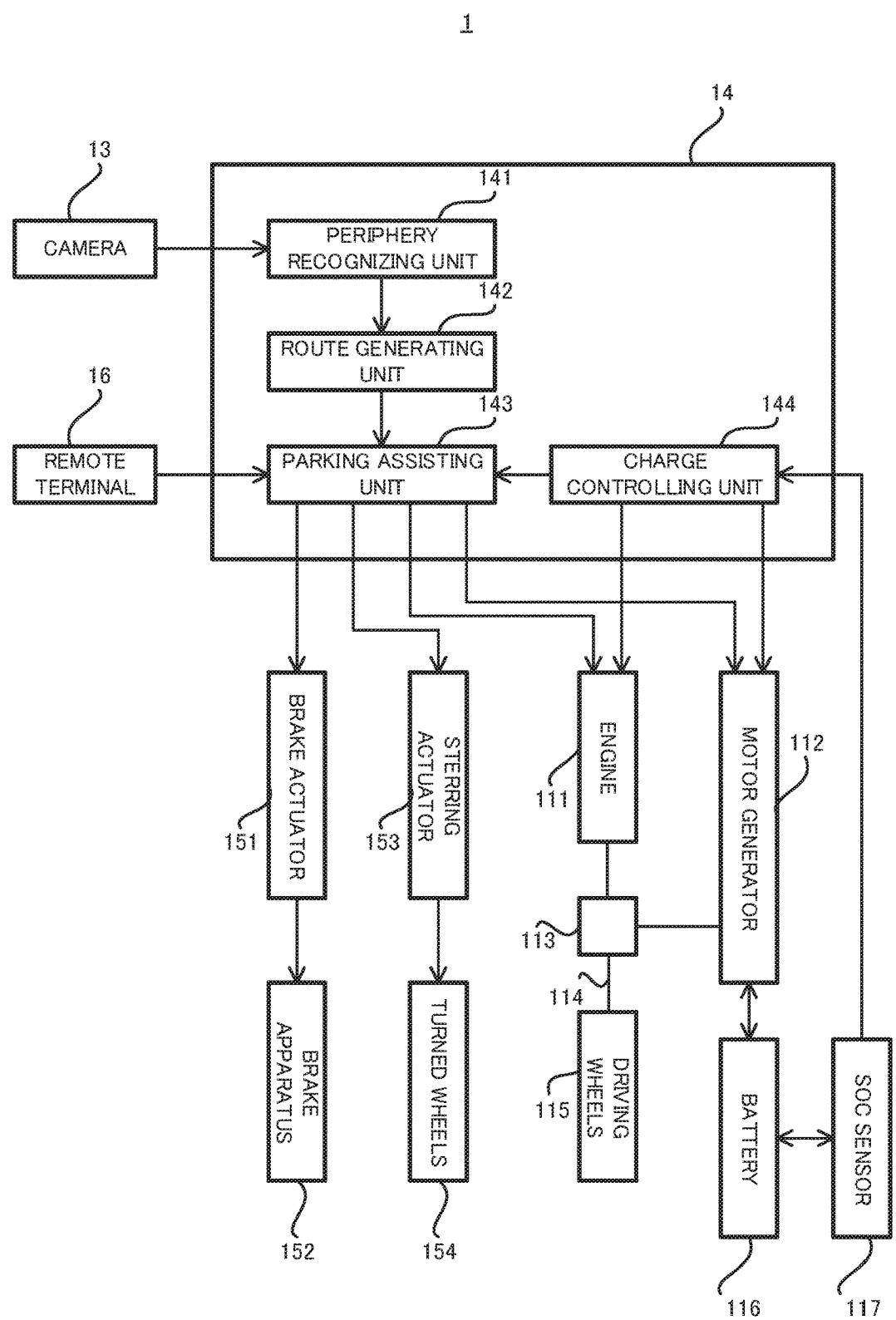

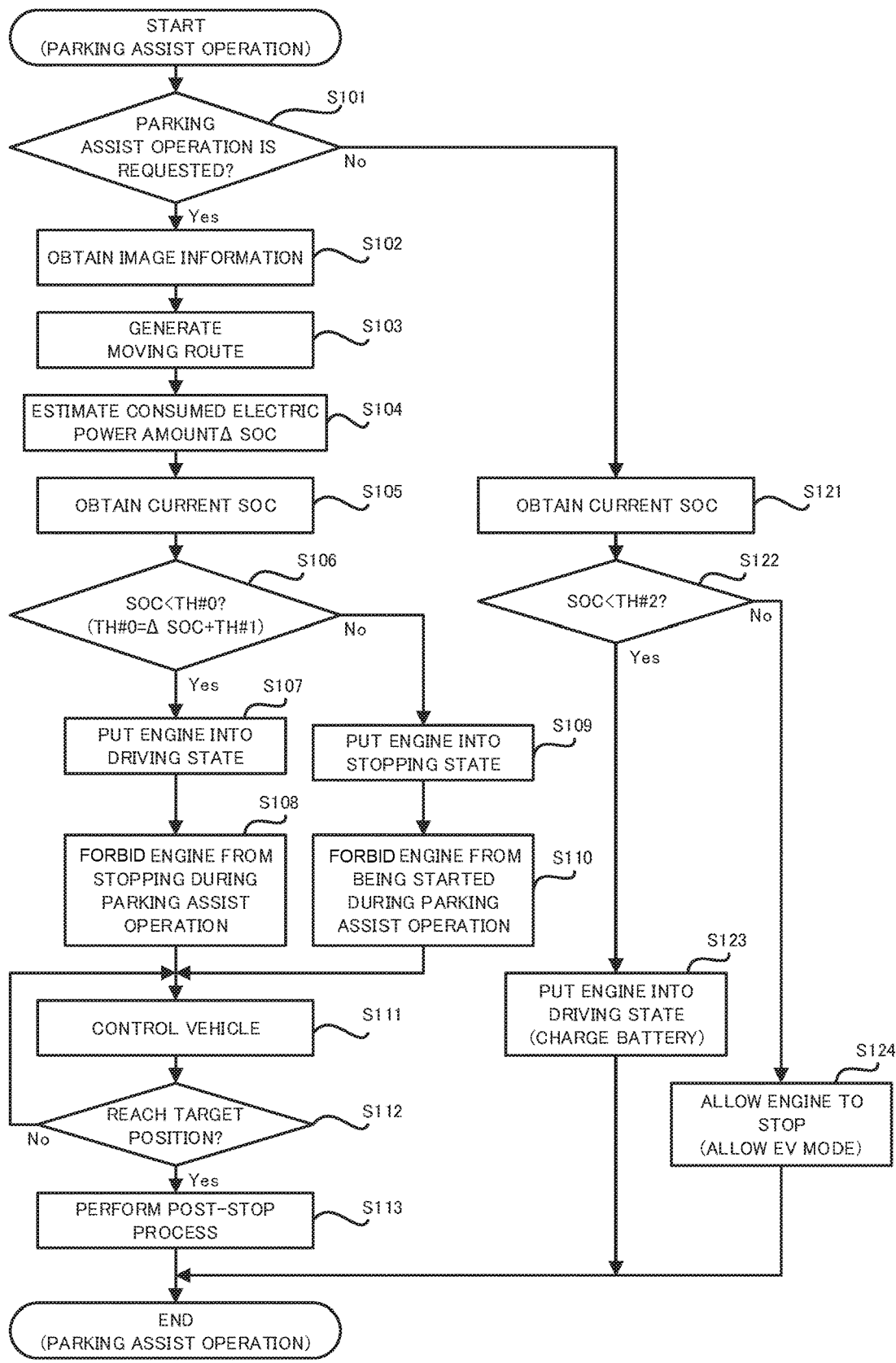
[FIG. 2]

[FIG. 3]
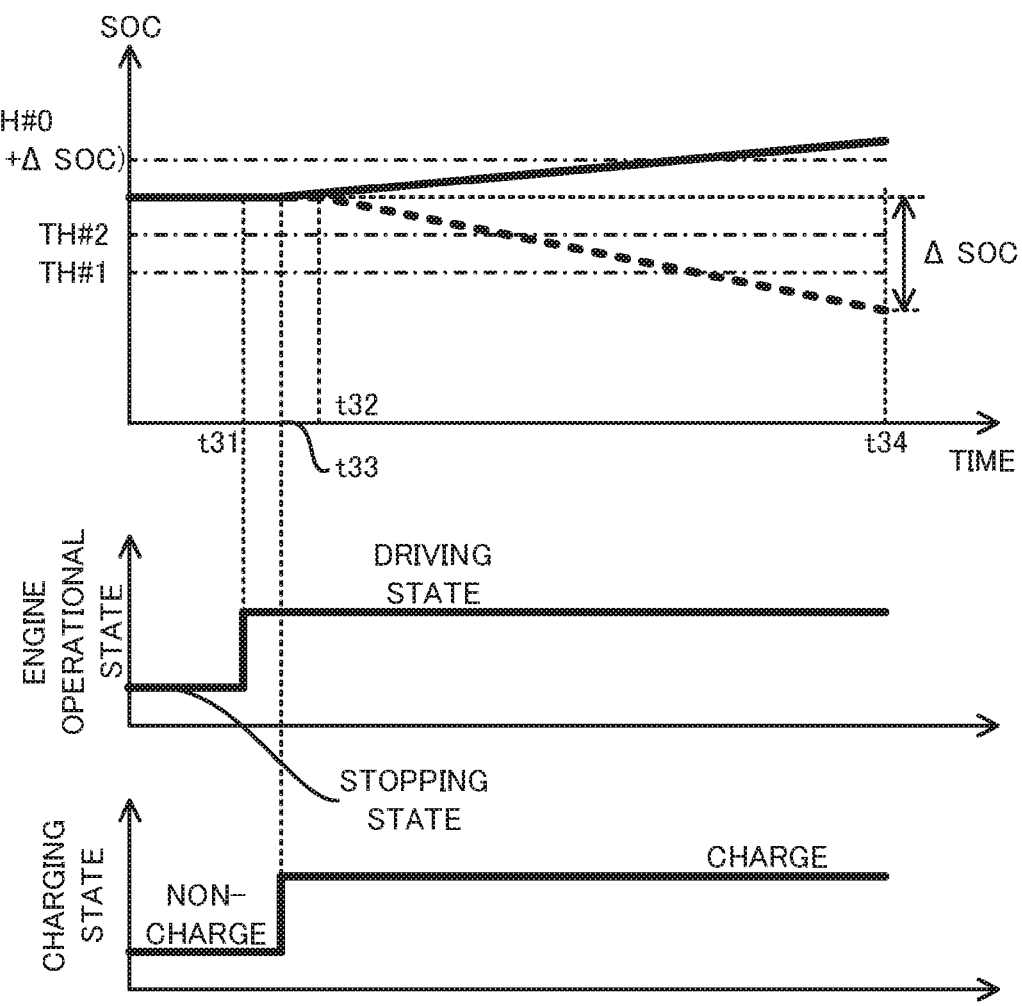

[FIG. 4]
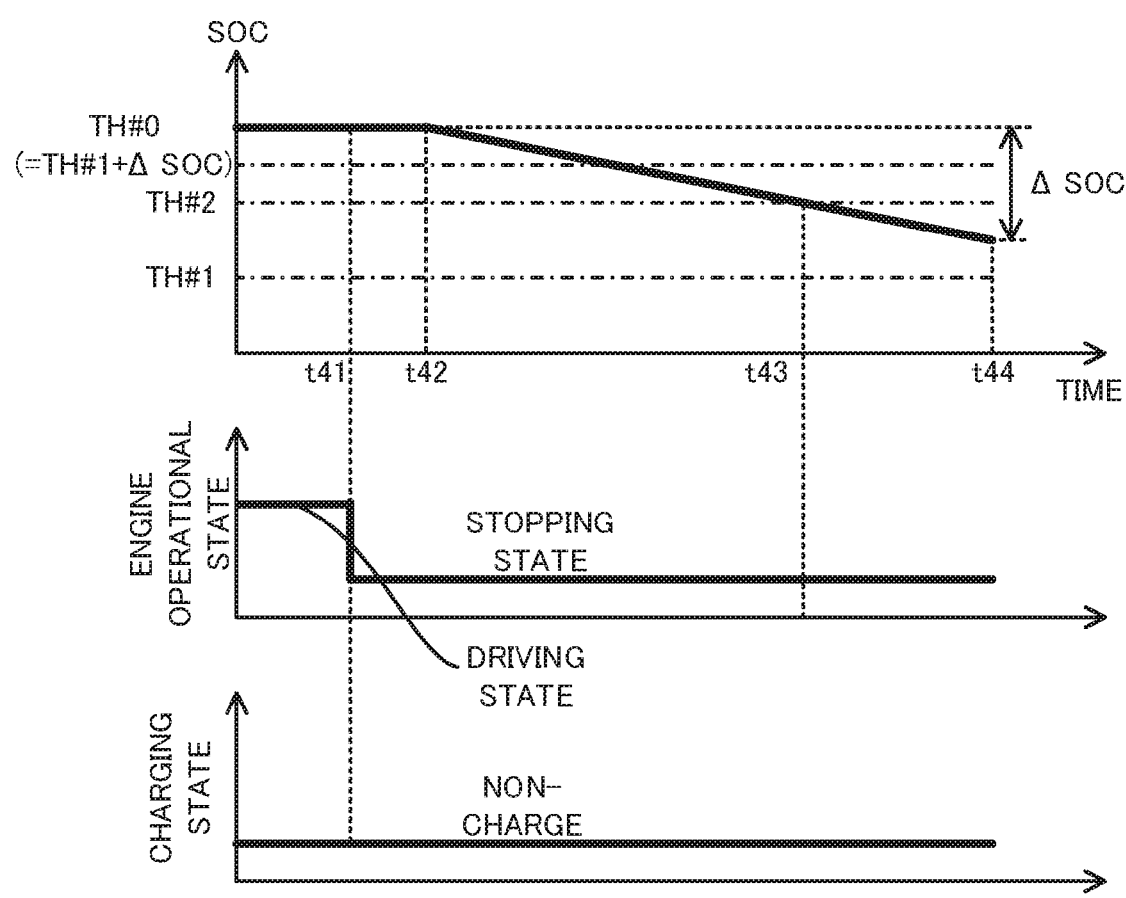

[FIG. 5]
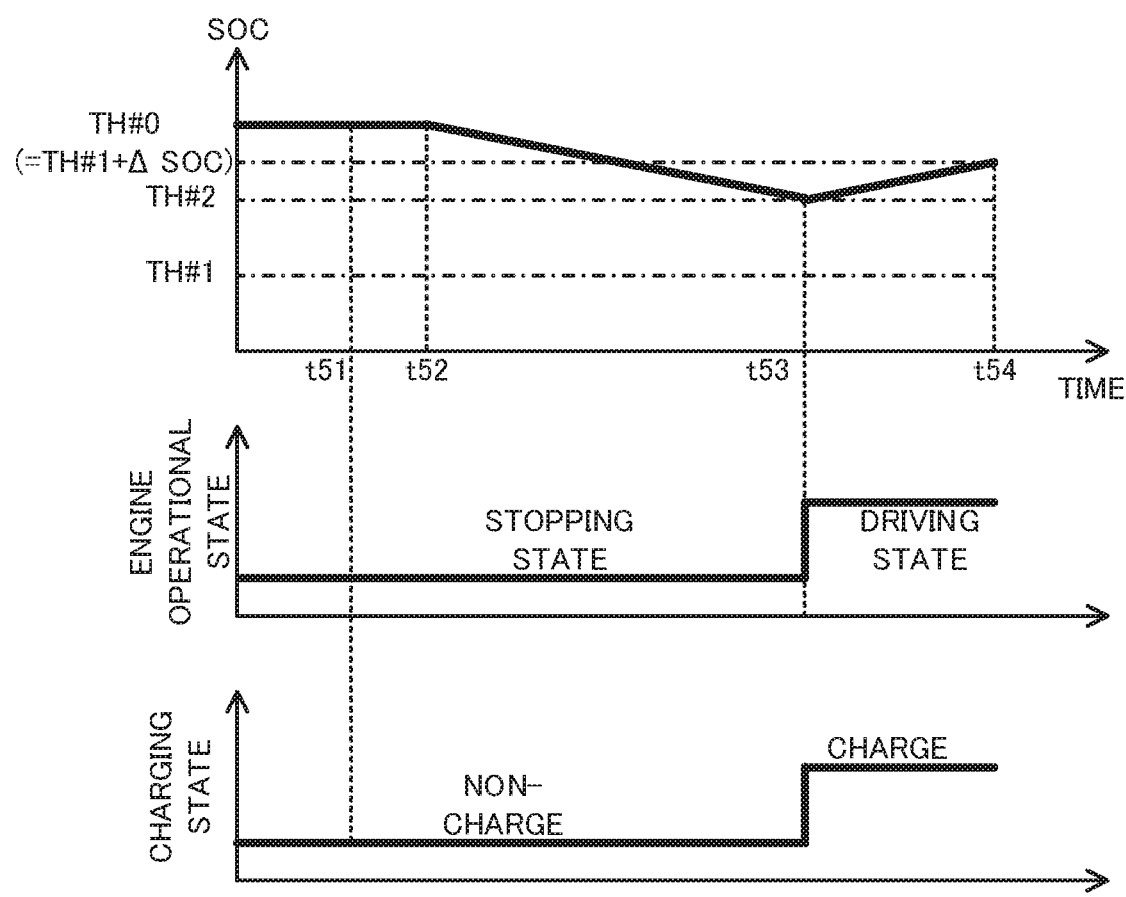

[FIG. 6]
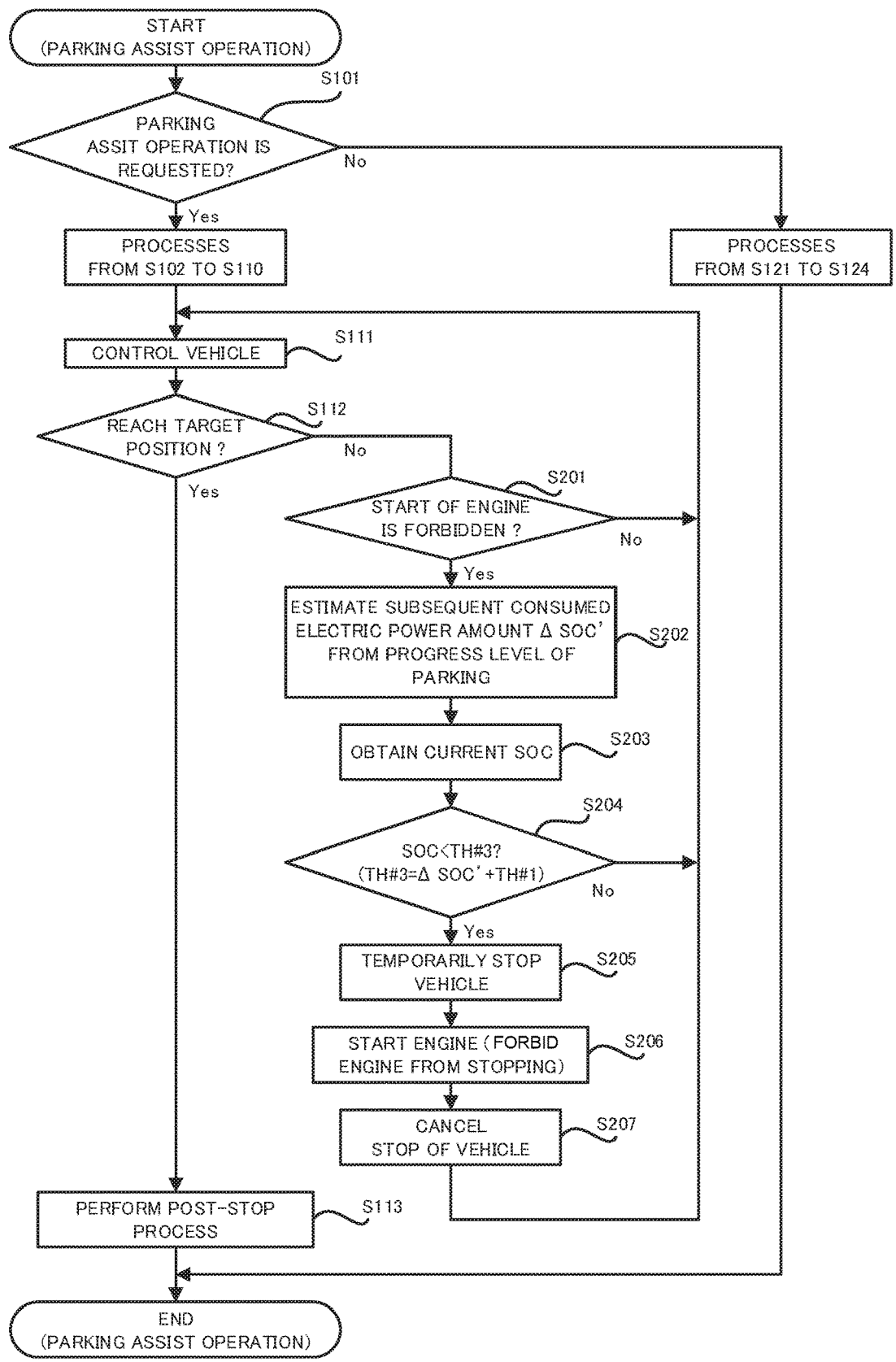

[FIG. 7]
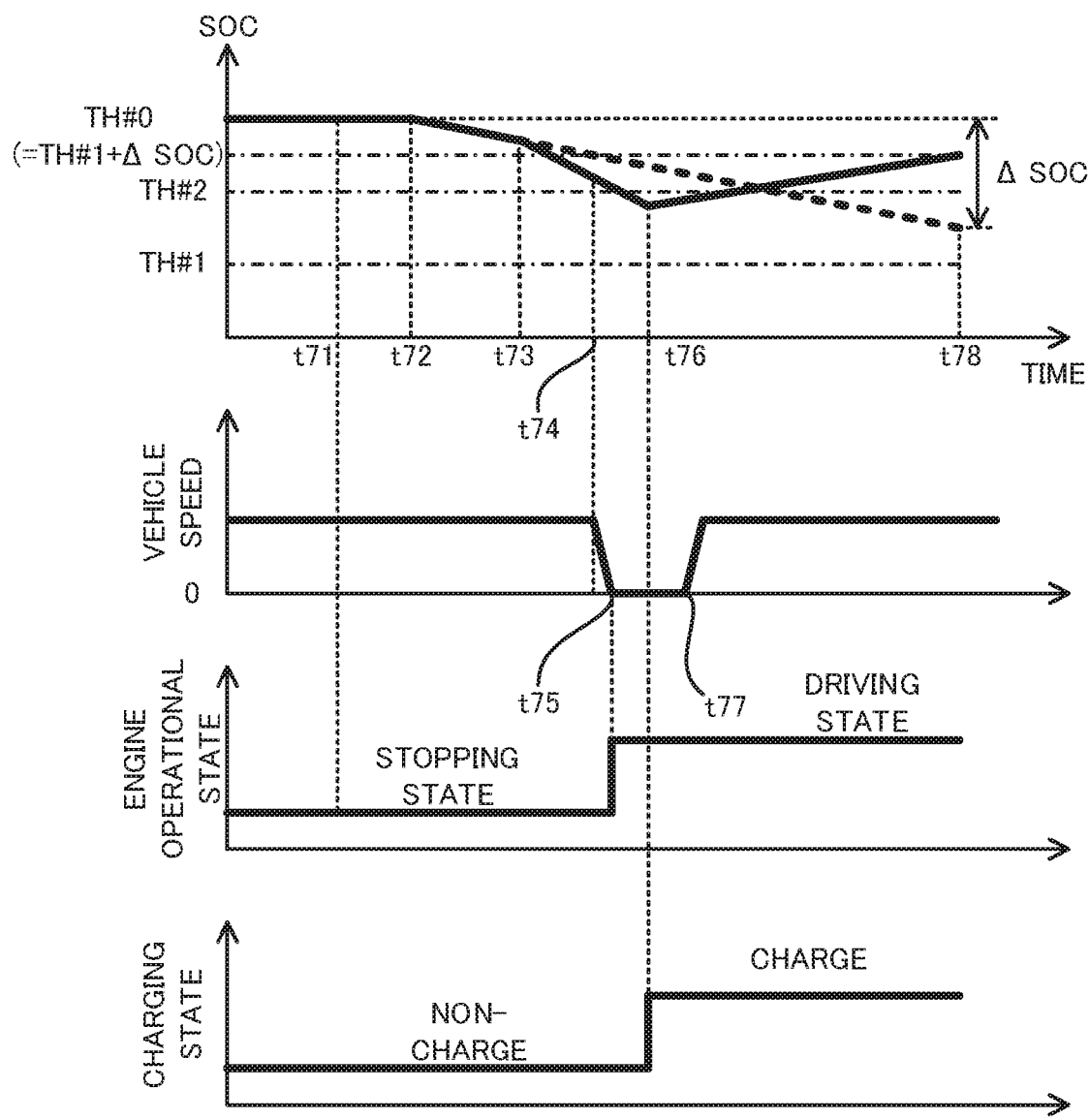

[FIG. 8]
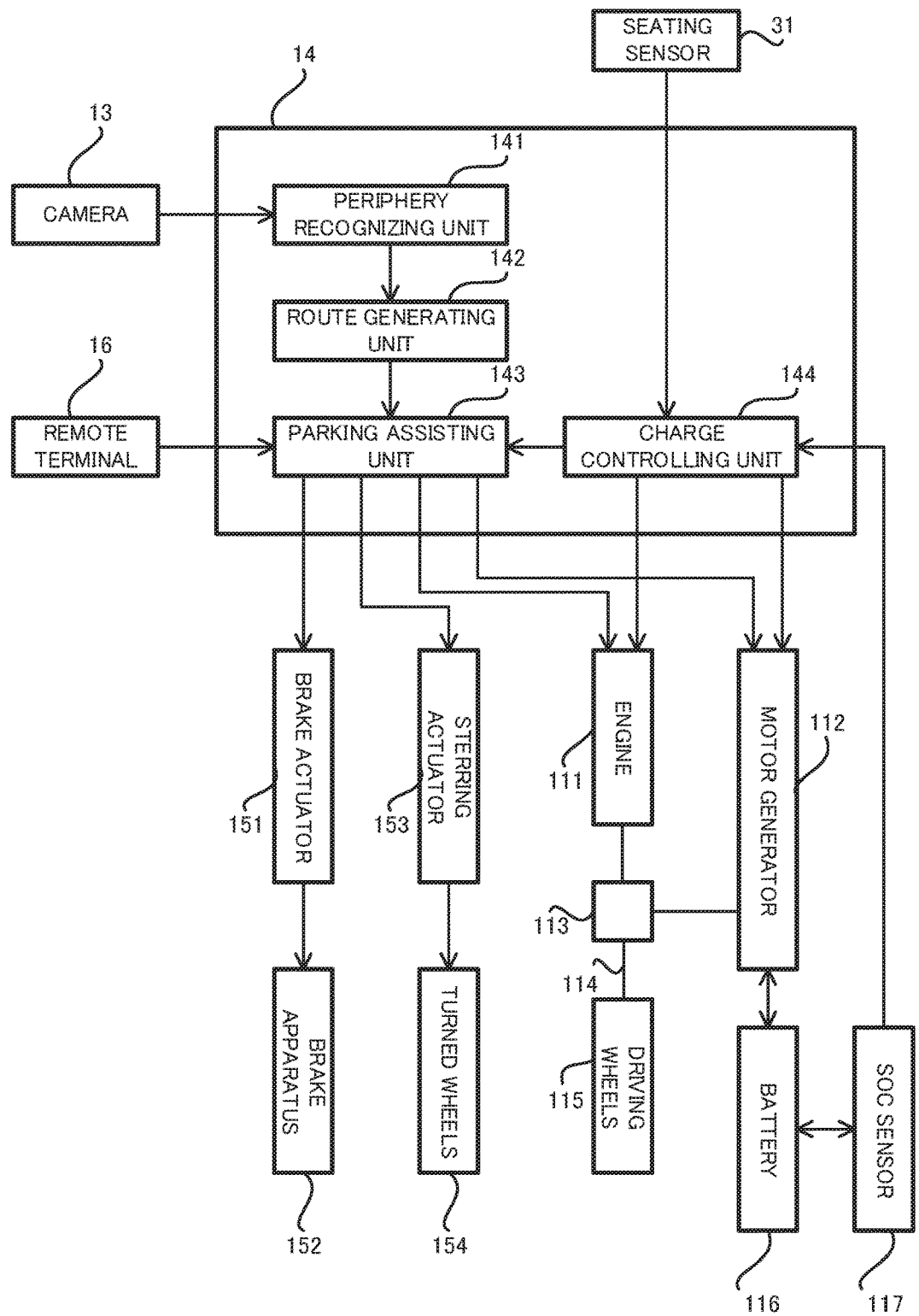

[FIG. 9]
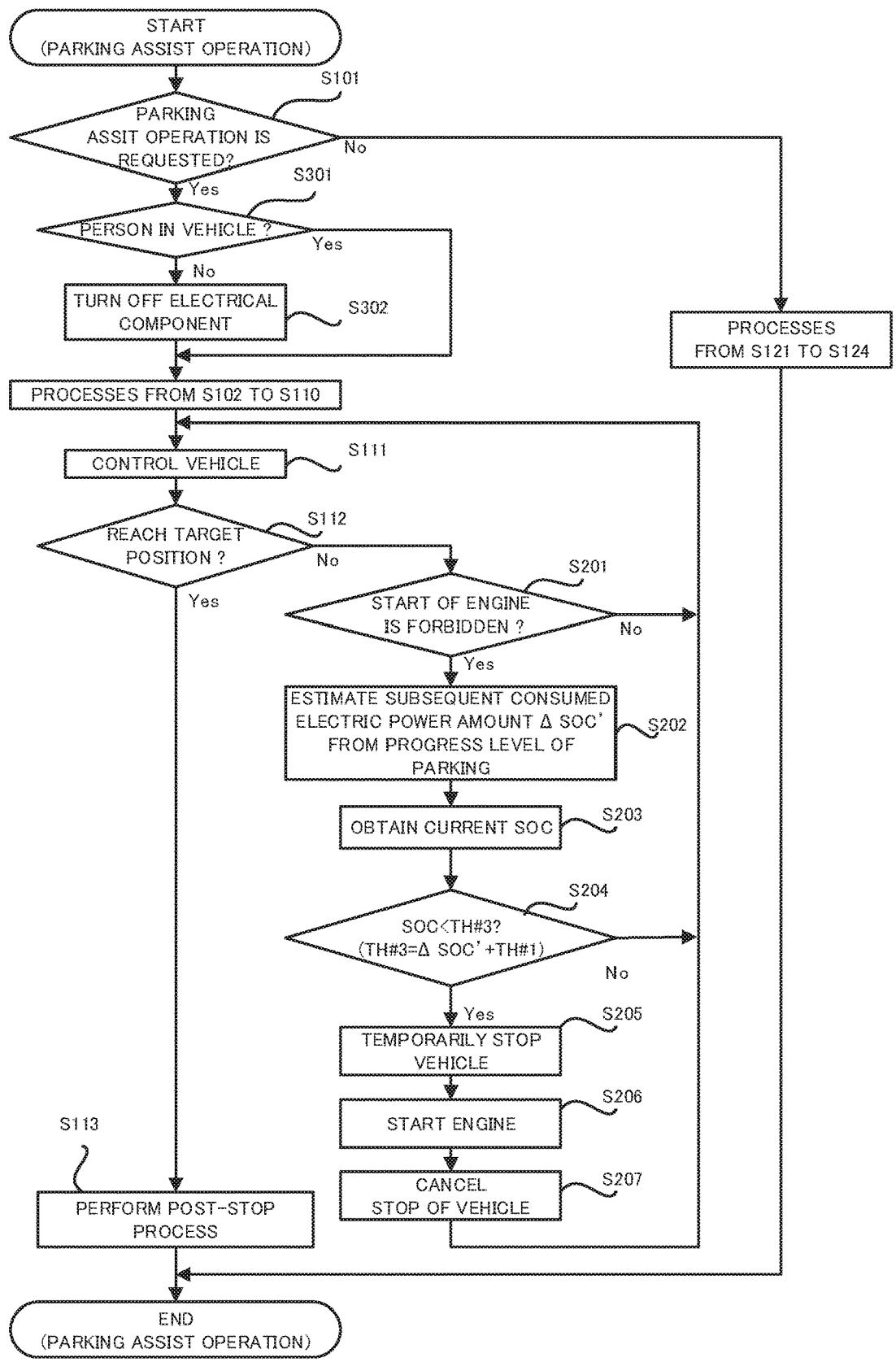

VEHICLE CONTROL APPARATUS

TECHNICAL FIELD

The present invention relates to a technical field of a vehicle control apparatus that is configured to control a hybrid vehicle having an engine and a rotating electrical machine.

BACKGROUND ART

A hybrid vehicle is capable of traveling in an EV (Electrical Vehicle) mode that allows the hybrid vehicle to move (travel) by using an output of a rotating electrical machine without driving an engine. However, if an amount of stored electric power (for example, SOC (State Of Charge) of an electric power storing device (for example, a battery) is less than a predetermined amount when the hybrid vehicle is moving in the EV mode, the hybrid vehicle charges the battery by staring the engine and allowing the rotating electrical machine to generate electric power by using an output of the engine (for example, see Patent Literatures 1 and 2).

CITATION LIST

Patent Literature

[Patent Literature 1] Japanese Unexamined Patent Application Publication No. 2010-111188
[Patent Literature 2] Japanese Unexamined Patent Application Publication No. 2008-247252

SUMMARY OF INVENTION

Technical Problem

A parking assist apparatus is well known. The parking assist apparatus is configured to perform a parking assist operation for automatically parking a vehicle at a target position at which the vehicle should be parked, by automatically moving the vehicle along a moving route from a current position of the vehicle to the target position in accordance with an instruction from a user (for example, a driver).

Here, there is a possibility that the engine is started for the purpose of charging the electric power storing device or supplying driving power to the hybrid vehicle as described above when the hybrid vehicle is moved by the parking assist operation in the EV mode. In this case, there is a possibility that the start of the engine varies the driving power of the hybrid vehicle. Specifically, rotational inertia power of an engine shaft (for example, a crank shaft) is relatively small immediately after the engine is started, and thus, there is a possibility that variation of cylinder pressure that is caused by a repetition of a compression stroke and an expansion stroke causes relatively large variation of rotating torque of the engine shaft. Therefore, there is a possibility that the driving power varies due to the variation of the rotating torque of the engine shaft in the hybrid vehicle in which the engine shaft is connected to a driving shaft. Note that there is a possibility that the driving power varies when the driven engine stops, for the same reason.

The parking assist apparatus usually automatically parks the vehicle at the target position without considering the start and the stop of the engine that are performed depending on the amount of the stored electric power in the electric power storing device in advance. Thus, if the driving power of the hybrid vehicle varies by way of the engine being started when the hybrid vehicle is moved by the parking assist operation error arises between an actual moving amount (namely, a moving amount caused by the varied driving power) of the hybrid vehicle and an intended moving amount (namely, a moving amount caused by the not-varied driving power). As a result, there is a technical problem that the hybrid vehicle is not parked at the target position with relatively high accuracy.

The above described technical problem is one example of the technical problem to be solved by the present invention. It is therefore an object of the present invention to provide, for example, a vehicle control apparatus that is configured to park a hybrid vehicle having an engine and a rotating electrical machine at a target position with relatively high accuracy.

Solution to Problem

<1>

One aspect of a vehicle control apparatus is configured to control a hybrid vehicle, the hybrid vehicle has an engine and a rotating electrical machine each of which is connected to a driving shaft and each of which is a source of driving power, the rotating electrical machine is capable of being driven by using an output of the engine to charge an electric power storage, the vehicle control apparatus has a controller, the controller is programmed to: perform a parking assist operation for automatically parking the hybrid vehicle at a target position on the hybrid vehicle; and perform a first control operation, (i) the first control operation allows the engine to stop, if an amount of the stored electric power in the electric power storage is larger than a first threshold value corresponding to an amount of the electric power at which the electric power storage needs to be charged, and (ii) the first control operation charges the electric power storage by driving the rotating electrical machine by using the output of the engine, if the amount of the stored electric power is smaller than the first threshold value, the controller is programmed to: (iii) perform a second control operation instead of the first control operation during a first period from an assist start time at which the parking assist operation is requested to be performed to an assist completion time at which the parking assist operation completes the parking of the hybrid vehicle at the target position, and (iv) perform the first control operation without performing the second control operation during a second period other than the first period, (v) the second control operation puts the engine into a stopping state before a moving start time at which the parking assist operation starts to move the hybrid vehicle and forbidding the engine from being started after the moving start time, if the amount of the stored electric power at a timing before the moving start time is larger than a second threshold value corresponding to an amount of the electric power that is capable of completing the parking of the hybrid vehicle at the target position with the engine being kept in the stopping state, and (vi) the second control operation puts the engine into a driving state before the moving start time and forbidding the engine from stopping after the moving start time, if the amount of the stored electric power at the timing before the moving start time is smaller than the second threshold value. Alternatively, one aspect of a vehicle control apparatus may be configured to have an assisting device and a controlling device instead of the above described controller, wherein the assisting device may be configured to perform the parking assist operation, the controlling device may be configured to perform the first control operation, and the controlling device may be configured to: perform the second control operation instead of the first control operation during the first period and perform the first control operation without performing the second control operation during the second period, and the rotating electrical machine may be capable being driven by using the output of the engine to charge an electric power storing device, instead of the electric power storage.

According to one aspect of the vehicle control apparatus, the engine that is in the stopping state (namely, that is stopping) is not started after the parking assist operation start to move the hybrid vehicle. Moreover, the engine that is in the driving state (namely, that is driven) does not stop after the parking assist operation start to move the hybrid vehicle. Thus, the driving power of the hybrid vehicle does not vary due to the start and the stop of the engine when the hybrid vehicle is moved by the parking assist operation. Therefore, the vehicle control apparatus is capable of parking the hybrid vehicle at the target position with relatively high accuracy.

<2>

In another aspect of the above described vehicle control apparatus, the controller is programmed to estimate, before the moving start time, an amount of the electric power consumed by the hybrid vehicle before completing the parking of the hybrid vehicle at the target position with the engine being kept in the stopping state, and to set the second threshold value on the basis of the estimated amount of the electric power. Alternatively, in another aspect of the above described vehicle control apparatus that is configured to have the assisting device and the controlling device, the controlling device may be configured to estimate, before the moving start time, the amount of the electric power consumed by the hybrid vehicle before the assisting device completes the parking of the hybrid vehicle at the target position with the engine being kept in the stopping state, and to set the second threshold value on the basis of the estimated amount of the electric power.

According to this aspect, the second threshold value can be set appropriately.

<3>

In another aspect of the above described vehicle control apparatus that is configured to estimate the amount of the electric power consumed by the hybrid vehicle, the controller is programmed to stop one portion of an electric component of the hybrid vehicle that bears no direct relation to the moving of the hybrid vehicle, before estimating the amount of the electric power. Alternatively, in another aspect of the above described vehicle control apparatus having the controlling device that is configured to estimate the amount of the electric power consumed by the hybrid vehicle, the controlling device may be configured to stop one portion of the electric component of the hybrid vehicle that bears no direct relation to the moving of the hybrid vehicle, before estimating the amount of the electric power.

According to this aspect, the controller is capable of estimating the amount of the electric power consumed by the hybrid vehicle without considering the amount of the electric power consumed by one portion of the electric component that bears no direct relation to the moving of the hybrid vehicle. Thus, an accuracy of estimating the amount of the electric power consumed by the hybrid vehicle due to the parking assist operation improves.

<4>

In another aspect of the above described vehicle control apparatus, the controller is programmed to temporarily stops the hybrid vehicle and to allow the engine to be started during a period when the hybrid vehicle temporarily stops, if the amount of the stored electric power at a predetermined time after the moving start time is smaller than a third threshold value corresponding to an amount of the electric power that is capable of completing the parking of the hybrid vehicle at the predetermined time at the target position when the start of the engine is forbidden. Alternatively, in another aspect of the above described vehicle control apparatus that is configured to have the assisting device and the controlling device, the controlling device may be configured to control the assisting device to temporarily stop the hybrid vehicle and to allow the engine to be started during the period when the hybrid vehicle temporarily stops, if the amount of the stored electric power at the predetermined time is smaller than the third threshold value when the start of the engine is forbidden.

According to this aspect, if the engine needs to be started for the purpose of charging the electric power storage or supplying the driving power to the hybrid vehicle when the start of the engine is forbidden after the moving start time, the hybrid vehicle temporarily stops and then the engine is started. Therefore, the engine that is in the stopping state is not started when the hybrid vehicle is moving. Therefore, the vehicle control apparatus is capable of parking the hybrid vehicle at the target position with relatively high accuracy.

<5>

In another aspect of the above described vehicle control apparatus that is configured to allow the engine to be started during a period when the hybrid vehicle temporarily stops, the controller is programmed to allow the hybrid vehicle to restart to move after the engine is started during the period when the hybrid vehicle temporarily stops and then the output of the engine is in a predetermined stable state. Alternatively, in another aspect of the above described vehicle control apparatus having the controlling device that is configured to allow the engine to be started during a period when the hybrid vehicle temporarily stops, the controlling device may be configured to allow the hybrid vehicle to restart to move after the engine is started during the period when the hybrid vehicle temporarily stops and then the output of the engine is in the predetermined stable state.

According to this aspect, since the hybrid vehicle restarts to move after the output of the engine is in the predetermined stable state, the driving power of the hybrid vehicle never vary due to the engine whose output is not stable. Therefore, the vehicle control apparatus is capable of parking the hybrid vehicle at the target position with relatively high accuracy.

BRIEF DESCRIPTION OF DRAWINGS

FIG. 1 is a block diagram that illustrates a structure of a vehicle in a first embodiment.

FIG. 2 is a flowchart that illustrates flow of a parking assist operation in the first embodiment.

FIG. 3 is a timing chart illustrating a temporal transition of condition of the hybrid vehicle on which the parking assist operation in the first embodiment is performed.

FIG. 4 is a timing chart illustrating a temporal transition of condition of the hybrid vehicle on which the parking assist operation in the first embodiment is performed.

FIG. 5 is a timing chart illustrating a temporal transition of condition of the hybrid vehicle on which the parking assist operation in the first embodiment is not performed.

FIG. 6 is a flowchart that illustrates flow of a parking assist operation in a second embodiment.

FIG. 7 is a timing chart illustrating a temporal transition of condition of the hybrid vehicle on which the parking assist operation in the second embodiment is performed.

FIG. 8 is a block diagram that illustrates a structure of a vehicle in a third embodiment.

FIG. 9 is a flowchart that illustrates flow of a parking assist operation in the third embodiment.

DESCRIPTION OF EMBODIMENTS

Hereinafter, with reference to drawings, one embodiment of a vehicle control apparatus of the present invention will be described. In the following description, a hybrid vehicle to which one embodiment of the vehicle control apparatus of the present invention is adapted will be described.

(1) Hybrid Vehicle 1 in First Embodiment

With reference to FIG. 1 to FIG. 5, a hybrid vehicle 1 in a first embodiment will be described.

(1-1) Structure of Hybrid Vehicle 1

Firstly, with reference to a block diagram illustrated in FIG. 1, the structure of the hybrid vehicle 1 in the first embodiment will be explained. As illustrated in FIG. 1, the hybrid vehicle 1 has: an engine 111, a motor generator 112; a transaxle 113; an driving shaft 114; driving wheels 115; a battery 116; a SOC (State Of Charge) sensor 117; a camera 13; an ECU (Electronic Control Unit) 14 that is one example of the above described "vehicle control apparatus"; a brake actuator 151; a brake apparatus 152; a steering actuator 153; and turned wheels (steered wheels) 154.

The engine 111 is configured to be driven by burning fuel such as gasoline or light diesel oil. The engine 111 configured to serve as a source of driving power of the hybrid vehicle 1. The motor generator 112 is configured to be driven by using electric power supplied from the battery 116. The motor generator 112 is configured to serve as a source of the driving power of the hybrid vehicle 1. Moreover, the motor generator 112 is configured to serve as an electric generator for charging the battery 116. When the motor generator 112 serves as the electric generator, a rotational axis of the motor generator 112 is rotated by an output (namely, the driving power) of the engine 111.

The transaxle 113 is a power transferring mechanism that is configured to connect each of an engine shaft (for example, a crank shaft) of the engine 111 and the rotational axis of the motor generator 112 to the driving shaft 114. Thus, the hybrid vehicle 1 is a parallel type or a split type of hybrid vehicle in which the engine shaft of the engine 111 is connected to the driving shaft 114. The driving power from the engine 111 is transferred to at least one of the motor generator 112 and the driving shaft 114 through the transaxle 113. The driving power from the motor generator 112 is transferred to at least one of the engine 111 and the driving shaft 114 through the transaxle 113. The driving power transferred to the driving shaft 114 is used as the driving power for moving the hybrid vehicle 1 through the driving wheels 115.

The battery 116 is configured to output, to the motor generator 112, the electric power that is necessary for the motor generator 112 to serve as the motor, when the hybrid vehicle 1 is in a power-running state. Moreover, the electric power generated by the motor generator 112 serving as the power generator is inputted to the battery 116 from the motor generator 112, when the hybrid vehicle 1 is in a regeneration state. A SOC that represents an amount of the stored electric power in the battery 116 is detected by the SOC sensor 117. The SOC detected by the SOC sensor 117 is outputted to the ECU 14.

The camera 13 is an imaging device that is configured to image (capture) periphery of the hybrid vehicle 1. The imaging result of the camera 13 is outputted to the ECU 14.

The ECU 14 is configured to control entire operation of the hybrid vehicle 1. Especially in the first embodiment, the ECU 14 is configured to perform a parking assist operation for automatically parking the hybrid vehicle 1 at a target position (for example, a parking facility, a parking section in the parking facility, a parking section on a road and the like). The ECU 14 is configured to perform the parking assist operation in response to an instruction from a user (for example, a driver) using a remote terminal 16, for example. Specifically, the remote terminal 16 has an operational button that is pushed by the user when user requests the parking assist operation to be performed. The remote terminal 16 is configured to inform the ECU 14 of a result of the pushed state of the operational button. The ECU 14 is configured to start the parking assist operation when the operational button that has not been pushed is newly pushed. The ECU 14 is configured to terminate the parking assist operation when the operational button that has been pushed is not pushed.

In order to perform the parking assist operation, the ECU 14 includes, as processing blocks that are logically realized in the ECU 14 or processing circuits that are physically realized in the ECU 14, a periphery recognizing unit 141, a route generating unit 142, a parking assisting unit 143 that is one example of the above described "assisting device", and a charge controlling unit 144 that is one example of the above described "controlling device".

Although an operation of each of the periphery recognizing unit 141, the route generating unit 142, the parking assisting unit 143, and the charge controlling unit 144 will be described later in detail with reference to FIG. 2 and so on, overview of the operation will be briefly described here. The periphery recognizing unit 141 is configured to recognize circumstance around the hybrid vehicle 1 on the basis of image information that is the imaging result of the camera 13. The route generating unit 142 is configured to generate (in other words, calculate) a moving route along which the hybrid vehicle 1 should move to reach the target position from a current position of the hybrid vehicle 1 on the basis of the recognized result of the periphery recognizing unit 141. The parking assisting unit 143 is configured to control the engine 111, the motor generator 112, the brake actuator 151 and the steering actuator 153 so that the hybrid vehicle 1 automatically moves along the moving route generated by the route generating unit 142. The charge controlling unit 144 is configured to control the charge of the battery 116.

Each of the engine 111 and the motor generator 112 is configured to adjust the driving power transferred to the driving wheels 115 under the control of the parking assisting unit 143. The brake actuator 151 is configured to control the brake apparatus 152 that is configured to brake the wheels (for example, the driving wheels 115 and the turned wheels 154) of the hybrid vehicle 1 so that braking force is applied to the hybrid vehicle 1 under the control of the parking assisting unit 143. The steering actuator 153 is configured to turn (steer) the turned wheels 154 that can be turned so that the hybrid vehicle 1 moves toward a desired direction under the control of the parking assisting unit 143. Note that the turned wheels 154 may be wheels that are different from the driving wheels 115, or may be wheels that are at least one portion of the driving wheels 115.

(1-2) Flow of Parking Assist Operation in First Embodiment

Next, with reference to a flowchart illustrated in FIG. 2, a flow of the parking assist operation in the first embodiment will be described. As illustrated in FIG. 2, the parking assisting unit 143 determines whether or not the user requests the parking assist operation to be performed by communicating with the remote terminal 16 (a step S101).

As a result of the determination at the step S101, if it is determined that the user does not request the parking assist operation to be performed (the step S101: No), the ECU 14 may not perform below described processes from a step S102 to a step S113 (namely, a process for automatically parking the hybrid vehicle 1 at the target position). In this case, the ECU 14 controls the hybrid vehicle 1 in a usual controlling method. One example of the operation of controlling the hybrid vehicle 1 in the usual controlling method will be described below.

If it is determined that the user does not request the parking assist operation to be performed, the charge controlling unit 144 controls the start and the stop of the engine 111 on the basis of the current SOC. Specifically, the charge controlling unit 144 obtains the current SOC from the SOC sensor 117 (a step S121). Then, the charge controlling unit 144 determines whether or not the current SOC obtained at the step S121 is smaller than a threshold value TH#2 that corresponds to the amount of the stored electrical power at which the charge of the battery 116 should be started (a step S122). Note that the threshold value TH#2 is one example of the above described "first threshold value". As a result of the determination at the step S122, if it is determined that the current SOC is smaller than the threshold value TH#2 (the step S122: Yes), the charge controlling unit 144 estimates that the battery 116 should be charged. Thus, in this case, the charge controlling unit 144 puts the engine 111 into a driving state (a step S123). Namely, the charge controlling unit 144 starts the engine 111, if the engine 111 already stops at the timing when it is determined that the current SOC is smaller than the threshold value TH#2, and the charge controlling unit 144 keeps driving the engine 111, if the engine 111 is already driven at the timing when it is determined that the current SOC is smaller than the threshold value TH#2. Moreover, the charge controlling unit 144 charges the battery 116 by driving the motor generator 112 as the power generator by using the driving power of the engine 111 (the step S123). On the other hand, as a result of the determination at the step S122, if it is determined that the current SOC is not smaller than the threshold value TH#2 (the step S122: No), the charge controlling unit 144 estimates that the battery 116 does not need to be charged. Thus, in this case, the charge controlling unit 144 allows the engine 111 to be in a stopping state. Namely, the charge controlling unit 144 allows the hybrid vehicle 1 to move (travel) in an EV (Electrical Vehicle) mode that allows the hybrid vehicle 1 to stop the engine 111 and to move by using the driving power of the motor generator 112. In this case, the hybrid vehicle 1 may move in the EV mode, because the hybrid vehicle 1 is allowed to move in the EV mode. Alternatively, the hybrid vehicle 1 may move in a HV (Hybrid Vehicle) mode that allows the hybrid vehicle 1 to keep driving the engine 111 to move, although the hybrid vehicle 1 is allowed to move in the EV mode.

On the other hand, as a result of the determination at the step S101, if it is determined that the user requests the parking assist operation to be performed (the step S101: Yes), the periphery recognizing unit 141 obtains, from the camera 13, the image information that is the imaging result of the camera 13 (a step S102). Then, the route generating unit 142 generate s the moving route along which the hybrid vehicle 1 should move to reach the target position from the current position of the hybrid vehicle 1 on the basis of the image information obtained at the step S102 (a step S103). Note that the route generating unit 142 may use an existing generation method as a method of generating the moving route on the basis of the image information, and thus, a detailed description of the method of generating the moving route is omitted.

Then, the charge controlling unit 144 estimates a consumed electric power amount ΔSOC that represents an amount of the electric power consumed by the hybrid vehicle 1 before the parking assisting unit 143 completes the parking of the hybrid vehicle 1 at the target position while the engine 111 keeps stopping (a step S104). Namely, the charge controlling unit 144 estimates the consumed electric power amount ΔSOC that represents an amount of the electric power consumed by the hybrid vehicle 1 before the hybrid vehicle 1 is parked at the target position by moving in the EV mode. The hybrid vehicle 1 is parked at the target position by moving along the moving route generated at the step S103. Thus, the charge controlling unit 144 may estimate the consumed electric power amount ΔSOC on the basis of the moving route generated at the step S103. Note that it is preferable that the consumed electric power amount ΔSOC be estimated by a same unit as the SOC. Thus, the consumed electric power amount ΔSOC is equal to a decreased amount of the SOC before the hybrid vehicle 1 is parked at the target position while the engine 111 keeps stopping.

Then, the charge controlling unit 144 obtains the current SOC from the SOC sensor 117 (a step S105). Then, the charge controlling unit 144 determines whether or not the current SOC obtained at the step S105 is smaller than a threshold value TH#0 (a step S106). The threshold value TH#0 corresponds to an amount of the stored electrical power that is large enough to complete the parking of the hybrid vehicle 1 at the target position while the engine 111 keeps stopping. Note that the threshold value TH#0 is one example of the above described "second threshold value".

The threshold value TH#0 that is used by the determination at the step S106 is set by the charge controlling unit 144 on the basis of the consumed electric power amount ΔSOC that is estimated at the step S104. Specifically, the charge controlling unit 144 sets, as the threshold value TH#0, a value that is obtained by adding a threshold value TH#1 to the consumed electric power amount ΔSOC. The threshold value TH#1 corresponds to an amount of the stored electrical power that is too small to start the engine 111 by the motor generator 112 that serves as a starter for the engine 111. The threshold value TH#1 is smaller than the above described threshold value TH#2 (for example, 40%) that corresponds to the amount of the stored electrical power at which the charge of the battery 116 should be started.

As a result of the determination at the step S106, if it is determined that the current SOC is smaller than the threshold value TH#0 (the step S106: Yes), it is estimated that the hybrid vehicle 1 cannot be parked at the target position if the engine 111 keeps stopping. Namely, it is estimated that the engine 111 needs to be put into the driving state (namely, the engine 111 needs to be driven) in order to charge the battery 116 or to supply the driving power to the hybrid vehicle 1 at at least one portion of a period when the hybrid vehicle 1 moves (namely, travels). Moreover, there is a possibility that the engine 111 is put into the stopping state (namely, the engine 111 stops) again after the charge of the battery 116 is completed. On the other hand, if the stopping engine 111 is started when the hybrid vehicle 1 is moved by the parking assist operation, there is a possibility that the driving power of the hybrid vehicle 1 varies due to the start of the engine 111. Similarly, if the driven engine 111 stops when the hybrid vehicle 1 is moved by the parking assist operation, there is a possibility that the driving power of the hybrid vehicle 1 varies due to the stop of the engine 111. The parking assisting unit 143 usually moves the hybrid vehicle 1 without estimating in advance the start and the stop of the engine 111 that are caused by the decrease of the SOC during a period when the hybrid vehicle 1 is moved by the parking assist operation. Thus, the variation of the driving power of the hybrid vehicle 1 caused by the start and the stop of the engine 111 corresponds to the variation of the driving power that is not estimated in advance by the parking assisting unit 143. As a result, if the engine 111 is started or stops during the period when the hybrid vehicle 1 is moved by the parking assist operation, there is a possibility that the parking assisting unit 143 cannot park the hybrid vehicle 1 at the target position with relatively high accuracy.

Thus, in the first embodiment, if it is determined that the current SOC is smaller than the threshold value TH#0, the charge controlling unit 144 puts the engine 111 into the driving state before the parking assist operation starts to move the hybrid vehicle 1 (a step S107). Namely, the charge controlling unit 144 puts the engine 111 into the driving state before the parking assist operation starts to move the hybrid vehicle 1, in preparation for charging the battery 116 or supplying the driving power from the engine 111 after the parking assist operation starts to move the hybrid vehicle 1. The charge controlling unit 144 starts the engine 111, if the engine 111 already stops at the timing when it is determined that the current SOC is smaller than the threshold value TH#0. The charge controlling unit 144 keeps driving the engine 111, if the engine 111 is already driven at the timing when it is determined that the current SOC is smaller than the threshold value TH#0. Moreover, the charge controlling unit 144 forbids the engine 111 from stopping during the period when the hybrid vehicle 1 is moved by the parking assist operation (a step S108). As a result, the engine 111 keeps being driven during the period when the hybrid vehicle 1 is moved by the parking assist operation.

On the other hand, as a result of the determination at the step S106, if it is determined that the current SOC is not smaller than the threshold value TH#0 (the step S106: No), it is estimated that the hybrid vehicle 1 can be parked at the target position even if the engine 111 keeps stopping. Namely, it is estimated that the engine 111 does not need to be started in order to charge the battery 116 or to supply the driving power to the hybrid vehicle 1 during the period when the hybrid vehicle 1 moves. On the other hand, even in this case, that fact remains that there is a possibility that the driving power of the hybrid vehicle 1 varies due to the start and the stop of the engine 111. Thus, in the first embodiment, if it is determined that the current SOC is not smaller than the threshold value TH#0, the charge controlling unit 144 puts the engine 111 into the stopping state before the parking assist operation starts to move the hybrid vehicle 1 (a step S109). The charge controlling unit 144 stops the engine 111, if the engine 111 is already driven at the timing when it is determined that the current SOC is not smaller than the threshold value TH#0. The charge controlling unit 144 keeps stopping the engine 111, if the engine 111 already stops at the timing when it is determined that the current SOC is not smaller than the threshold value TH#0. Moreover, the charge controlling unit 144 forbids the engine 111 from being started during the period when the hybrid vehicle 1 is moved by the parking assist operation (a step S110). As a result, the engine 111 keeps stopping during the period when the hybrid vehicle 1 is moved by the parking assist operation.

Then, the parking assisting unit 143 controls the engine 111, the motor generator 112, the brake actuator 151 and the steering actuator 153 to automatically moves the hybrid vehicle 1 along the moving route generated at the step S103 (a step S111). As a result, the hybrid vehicle 1 is automatically parked at the target position without the operation of an acceleration pedal, a brake pedal and a steering wheel by the user.

If the stop of the engine 111 is forbidden, the parking assisting unit 143 automatically moves the hybrid vehicle 1 by using at least one of the driving power of the engine 111 and the driving power of the motor generator 112. Namely, the parking assisting unit 143 automatically moves the hybrid vehicle 1 in the HV mode. Moreover, the parking assisting unit 143 charges the battery 116 by driving the motor generator 112 as the power generator by using the driving power of the engine 111, if needed. On the other hand, if the start of the engine 111 is forbidden, the parking assisting unit 143 automatically moves the hybrid vehicle 1 by using the driving power of the motor generator 112. Namely, the parking assisting unit 143 automatically moves the hybrid vehicle 1 in the EV mode.

Then, the parking assisting unit 143 determines whether or not the hybrid vehicle 1 reaches the target position (a step S112). As a result of the determination at the step S112, if it is determined that the hybrid vehicle 1 does not reach the target position yet (a step S112: No), the parking assisting unit 143 keeps automatically moving the hybrid vehicle 1 (the step S111). On the other hand, if it is determined that the hybrid vehicle 1 reaches the target position (a step S112: Yes), the parking assisting unit 143 performs a post-stop process (a step S113). The post-stop process includes a process of operating a parking brake of the hybrid vehicle 1 and a process of stopping the hybrid vehicle 1 (for example, turning off an ignition).

Moreover, the post-stop process may include a process of calculating a consumed electric power amount $\Delta SOC_{ACT}$ that represents an amount of the electric power actually consumed by the hybrid vehicle 1 before the hybrid vehicle 1 is parked at the target position. The consumed electric power amount $\Delta SOC_{ACT}$ may be used when the consumed electric power amount $\Delta SOC$ is estimated at the step S104. Namely, the charge controlling unit 144 may learn the consumed electric power amount $\Delta SOC_{ACT}$ and may estimate the consumed electric power amount $\Delta SOC$ on the basis of the learned result. As a result, the accuracy of estimating the consumed electric power amount $\Delta SOC$ improves.

Then, the ECU 14 terminates the parking assist operation illustrated in FIG. 2. If the parking assist operation illustrated in FIG. 2 is terminated, the ECU 14 starts the parking assist operation illustrated in FIG. 2 gain after a predetermined period lapses. Namely, the parking assist operation illustrated in FIG. 2 is performed repeatedly with a cycle based on the predetermined period.

As described above, in the first embodiment, if the current SOC is smaller than the threshold value TH#0, the engine 111 is put into the driving state before the parking assist operation starts to move the hybrid vehicle 1 and the stop of the engine 111 is forbidden after the parking assist operation starts to move the hybrid vehicle 1. As a result, the driven engine 111 does not stop during the period when the hybrid vehicle 1 is moved by the parking assist operation. Moreover, in the first embodiment, if the current SOC is not smaller than the threshold value TH#0, the engine 111 is put into the stopping state before the parking assist operation starts to move the hybrid vehicle 1 and the start of the engine 111 is forbidden after the parking assist operation starts to move the hybrid vehicle 1. As a result, the stopping engine 111 is not started during the period when the hybrid vehicle 1 is moved by the parking assist operation. As a result, the parking assisting unit 143 is capable of parking the hybrid vehicle 1 at the target position with relatively high accuracy without being affected by the variation of the driving power of the hybrid vehicle 1 caused by the start and the stop of the engine 111.

Specifically, FIG. 3 is a timing chart illustrating one example of a temporal transition of the SOC, an operational state of the engine 111 and a charging state of the battery 116 when the current SOC is smaller than the threshold value TH#0. As illustrated in FIG. 3, the user requests the parking assist operation to be performed at a time t31 and the parking assist operation starts to move the hybrid vehicle 1 at a time t32. Therefore, the time t31 is one example of the above described "assist start time" and the time t32 is one example of the above described "moving start time". In this case, the SOC at the time t31 is smaller than the threshold value TH#0 (=the threshold value TH#1+the consumed electric power amount $\Delta$SOC). Namely, if the hybrid vehicle 1 is moved by the parking assist operation in the EV mode, it is estimated that the SOC becomes smaller than the threshold value TH#1 before a time t34 at which the hybrid vehicle 1 reaches the target position, as illustrated by a thick dashed line in FIG. 3. Thus, the engine 111 is put into the driving state before the time t32 (at the time t31 in an example illustrated in FIG. 3). Note that FIG. 3 illustrates an example in which the engine 111 already stops before the time t31 because the SOC at the time t31 is larger than the threshold value TH#2. In addition, if the charge of the battery 116 is started after the hybrid vehicle 1 starts to move, there is a possibility that load of the engine 111 varies due to the start of the charge of the battery 116. There is a possibility that the variation of the load of the engine 111 results in the variation of the driving power of the hybrid vehicle 1. Thus, the motor generator 112 starts to be driven as the power generator by using the driving power of the engine 111 at a timing (a time t33 in an example illustrated in FIG. 3) after the engine 111 is put into the driving state and before the hybrid vehicle 1 starts to move. As a result, after the time t33, the SOC increases as the battery 116 is charged. After the time t32, the hybrid vehicle 1 moves to the target position in the HV mode while the battery 116 is charged. Here, after the time t32, although the SOC is larger than the threshold value TH#2, the engine 111 does not stop because the stop of the engine 111 is forbidden. Therefore, the parking assisting unit 143 is capable of moving the hybrid vehicle 1 without being affected by the variation of the driving power of the hybrid vehicle 1 caused by the stop of the engine 111. Moreover, the engine 111 is not started during the period when the hybrid vehicle 1 moves, and thus the stopping engine 111 is not started during the period when the hybrid vehicle 1 moves. Therefore, the parking assisting unit 143 is capable of moving the hybrid vehicle 1 without being affected by the variation of the driving power of the hybrid vehicle 1 caused by the start of the engine 111. As a result, the hybrid vehicle 1 reaches the target position at the time t34. Note that the time t34 is one example of the above described "assist completion time".

Next, FIG. 4 is a timing chart illustrating one example of a temporal transition of the SOC, an operational state of the engine 111 and a charging state of the battery 116 when the current SOC is not smaller than the threshold value TH#0. As illustrated in FIG. 4, the user requests the parking assist operation to be performed at a time t41 and the parking assist operation starts to move the hybrid vehicle 1 at a time t42. Therefore, the time t41 is one example of the above described "assist start time" and the time t42 is one example of the above described "moving start time". In this case, the SOC at the time t41 is larger than the threshold value TH#0 (=the threshold value TH#1+the consumed electric power amount $\Delta$SOC). Thus, the engine 111 is put into the stopping state before the time t42 (at the time t41 in an example illustrated in FIG. 4). Note that FIG. 4 illustrates an example in which the engine 111 is already driven at the time t41 although the SOC at the time t41 is larger than the threshold value TH#2. As a result, after the time t42, the hybrid vehicle 1 moves to the target position in the EV mode. Since the hybrid vehicle 1 moves in the EV mode, the SOC decreases gradually after the time t42. As a result, although the SOC is smaller than the threshold value TH#2 at a time t43, the engine 111 is not started because the start of the engine 111 is forbidden. Therefore, the parking assisting unit 143 is capable of moving the hybrid vehicle 1 without being affected by the variation of the driving power of the hybrid vehicle 1 caused by the start of the engine 111. As a result, the hybrid vehicle 1 reaches the target position at a time t44. Note that the time t44 is one example of the above described "assist completion time".

Note that FIG. 5 is a timing chart illustrating one example of a temporal transition of the SOC, an operational state of the engine 111 and a charging state of the battery 116 in a comparison example in which the start and the stop of the engine 111 are not forbidden even in the period when the hybrid vehicle 1 is moved by the parking assist operation and the start and the stop of the engine 111 are controlled on the basis of a magnitude relationship between the SOC and the threshold value TH#2. As illustrated in FIG. 5, the user requests the parking assist operation to be performed at a time t51 and the parking assist operation starts to move the hybrid vehicle 1 at a time t52. In this case, the SOC is larger than the threshold value TH#2 from the time t52 to a time t53, and thus the engine 111 is put into the stopping state from the time t52 to the time t53. Then, the SOC is smaller than the threshold value TH#2 at the time t53, and thus the engine 111 is started at the time t53 and the battery 116 is charged. Thus, the driving power of the hybrid vehicle 1 varies due to the start of the engine 111 during the period when the hybrid vehicle 1 moves. As a result, the parking assisting unit 143 has a technical problem that there is a possibility that the parking assisting unit 143 is not capable of parking the hybrid vehicle 1 at the target position with relatively high accuracy. The hybrid vehicle 1 in the first embodiment is useful because the hybrid vehicle 1 in the first embodiment is capable of solving this technical problem.

Moreover, in the first embodiment, the consumed electric power amount $\Delta$SOC that represents the amount of the electric power consumed by the hybrid vehicle 1 before the hybrid vehicle 1 is parked at the target position is estimated and the above described threshold value TH#0 is set on the basis of the estimated consumed electric power amount $\Delta$SOC. Thus, the charge controlling unit 144 is capable of determining with relatively high accuracy whether or not the hybrid vehicle 1 can be parked at the target position while the engine 111 keeps stopping. Namely, the charge controlling unit 144 is capable of determining with relatively high accuracy whether or not to forbidden the engine 111 from being started or stopping during the period when the hybrid vehicle 1 moves.

However, the hybrid vehicle 1 may set the threshold value TH#0 on the basis of the consumed electric power amount ΔSOC that is a fixed value, instead of continuously estimating the consumed electric power amount ΔSOC. For example, when the hybrid vehicle 1 is parked at the same parking facility, the consumed electric power amount ΔSOC becomes substantially same value every time. Therefore, the fixed consumed electric amount ΔSOC based on the parking facility at which the hybrid vehicle 1 is parked may be used.

In the above described description, the threshold value TH#1 that is used to set the threshold value TH#0 is smaller than the threshold value TH#2. However, the threshold value TH#1 may be same as or larger than the threshold value TH#2. In any case, any value may be used as the threshold value TH#1 as long as the threshold value TH#0 corresponding to the amount of the stored electrical power that is large enough to complete the parking of the hybrid vehicle 1 at the target position while the engine 111 keeps stopping can be set.

(2) Hybrid Vehicle 2 in Second Embodiment

Next, a hybrid vehicle 2 in a second embodiment will be described. The hybrid vehicle 2 in the second embodiment is different from the hybrid vehicle 1 in the first embodiment in that one portion of the parking assist operation performed by the ECU 14 in the second embodiment is different from that in the first embodiment. The structure of the hybrid vehicle 2 may be same as the structure of the hybrid vehicle 1. Therefore, with reference to a flowchart illustrated in FIG. 6, a flow of the parking assist operation in the second embodiment will be described below. Note that a detailed description of a process that is same as the process in the above described parking assist operation in the first embodiment will be omitted by assigning same step number to the process.

As illustrated in FIG. 6, even in the second embodiment, the processes from the step S121 to the step S124 are performed if it is determined that the user does not request the parking assist operation to be performed (the step S101: No), the processes from the step S102 to the step S112 are performed if it is determined that the user requests the parking assist operation to be performed (the step S101: Yes), and the processes at the step S113 is performed if it is determined that the hybrid vehicle 2 reaches the target position (the step S112: Yes), as with the first embodiment.

In the second embodiment, as a result of the determination at the step S112, if it is determined that the hybrid vehicle 2 does not reach the target position yet (the step S112: No), the charge controlling unit 144 determines whether or not the start of the engine 111 is forbidden (a step S201). As a result of the determination at the step S201, if it is determined that the start of the engine 111 is not forbidden (the step S201: No), the parking assisting unit 143 keeps automatically moving the hybrid vehicle 2 (the step S111).

On the other hand, as a result of the determination at the step S201, if it is determined that the start of the engine 111 is forbidden (the step S201: Yes), the charge controlling unit 144 estimates a consumed electric power amount ΔSOC' that represents an amount of the electric power consumed from now by the hybrid vehicle 2 before the parking assisting unit 143 completes the parking of the hybrid vehicle 2 at the target position while the engine 111 keeps stopping (a step S202). The parking assisting unit 143 already moves the hybrid vehicle 2 to some extent at a timing when the process at the step S202 is performed, and thus the hybrid vehicle 2 has already moved along one portion of the moving route generated at the step S103. Therefore, the charge controlling unit 144 estimates the consumed electric power amount ΔSOC' that represents an amount of the electric power consumed by the hybrid vehicle 2 during a period when the hybrid vehicle 2 moves along remaining portion of the moving route generate at the step S103.

Then, the charge controlling unit 144 obtains the current SOC from the SOC sensor 117 (a step S203). Then, the charge controlling unit 144 determines whether or not the current SOC obtained at the step S203 is smaller than a threshold value TH#3 (a step S204). The threshold value TH#3 corresponds to an amount of the stored electrical power that is large enough to move the hybrid vehicle 2 along the remaining portion of the moving route and to complete the parking of the hybrid vehicle 2 at the target position while the engine 111 keeps stopping. Note that the threshold value TH#3 is one example of the above described "third threshold value". The threshold value TH#3 that is used by the determination at the step S204 is set by the charge controlling unit 144 on the basis of the consumed electric power amount ΔSOC' that is estimated at the step S202. Specifically, the charge controlling unit 144 sets, as the threshold value TH#3, a value that is obtained by adding the above described threshold value TH#1 to the consumed electric power amount ΔSOC'. However, the charge controlling unit 144 may set, as the threshold value TH#3, a value that is obtained by adding a threshold value different from the threshold value TH#1 (for example, a threshold value smaller than the threshold value TH#1) to the consumed electric power amount ΔSOC'.

As a result of the determination at the step S204, if it is determined that the current SOC is not smaller than the threshold value TH#3 (the step S204: No), the parking assisting unit 143 keeps automatically moving the hybrid vehicle 2 (the step S111). On the other hand, as a result of the determination at the step S204, if it is determined that the current SOC is smaller than the threshold value TH#3 (the step S204: Yes), it is estimated that the hybrid vehicle 2 cannot be parked at the target position if the engine 111 keeps stopping, although the start of the engine 111 is forbidden. Note that it was determined once before the parking assisting unit 143 started to move the hybrid vehicle 2 that the hybrid vehicle 2 could be parked at the target position while the engine 111 keeps stopping, because the start of the engine 111 is forbidden. One reason why it is determined at the step S204 that the current SOC is smaller than the threshold value TH#3 is that the actual moving condition of the hybrid vehicle 2 makes the amount of the consumed electric power in the battery 116 be larger than expected.

In this case, the charge controlling unit 144 starts the engine 111 although the start of the engine 111 is forbidden once (a step S206). However, if only the engine 111 is started, there is a possibility that the driving power of the hybrid vehicle 2 varies due to the start of the engine 111, as described above. Thus, the charge controlling unit 144 controls the parking assisting unit 143 to temporarily stop the hybrid vehicle 2 before the engine 111 is started (a step S205). The "temporarily stop" in this embodiment means a condition where the hybrid vehicle 2 stops by fixing the driving shaft 114 (namely, a speed of the hybrid vehicle 2 is zero). The parking assisting unit 143 temporarily stops the hybrid vehicle 2 by controlling the brake actuator 151 and the like (the step S205). Then, the charge controlling unit 144 starts the engine 111 (the step S206). Moreover, the charge controlling unit 144 forbids the engine 111 from stopping after the hybrid vehicle 2 restarts to move (the step S206). Then, the charge controlling unit 144 controls the parking assisting unit 143 so that the hybrid vehicle 2 restarts to move after the output of the engine 111 is in a predetermined stable state (a step S207). The predetermined stable state means a condition where the output of the engine 111 is stable (for example, a rotation number of the engine 111 is stable) enough to completely or substantially eliminate a possibility that variation of cylinder pressure that is caused by a repetition of a compression stroke and an expansion stroke causes relatively large variation of rotating torque of the engine shaft. Then, the processes after the step S111 are performed.

As described above, the effect that is same as the effect achieved by the first embodiment can be also achieved by the second embodiment. Moreover, in the second embodiment, even after the hybrid vehicle 2 starts to move in the condition where the start of the engine 111 is forbidden, the start of the engine 111 is allowed as necessary. Therefore, even when the amount of the consumed electric power in the battery 116 becomes larger than expected after the hybrid vehicle 2 starts to move in the condition where the start of the engine 111 is forbidden, the parking assisting unit 143 is capable of parking the hybrid vehicle 2 at the target position.

Especially in the second embodiment, the engine 111 is started when the hybrid vehicle 2 temporarily stops. Namely, the engine 111 is started when the driving shaft 114 does not rotate (namely, is substantially fixed). Moreover, the hybrid vehicle 2 restarts to move after the output of the engine 111 is in the predetermined stable state. Thus, even if the rotating torque of the engine shaft of the engine 111 varies due to the start of the engine 111, the variation of the engine shaft does not cause the variation of the driving power of the hybrid vehicle 2. Therefore, even when the engine 111 is started after the hybrid vehicle 2 starts to move, the parking assisting unit 143 is capable of parking the hybrid vehicle 2 at the target position with relatively high accuracy without being affected by the variation of the driving power of the hybrid vehicle 2 caused by the start of the engine 111.

Here, with reference to FIG. 7, one example of the state of the hybrid vehicle 2 when the engine 111 is started after the hybrid vehicle 2 starts to move will be described. As illustrated in FIG. 7, the user requests the parking assist operation to be performed at a time t71 and the parking assist operation starts to move the hybrid vehicle 1 at a time t72. In this case, the SOC at the time t71 is larger than the threshold value TH#0 (=TH#1+ΔSOC). Thus, the engine 111 stops before the time t72 (at the time t71 in the example illustrated in FIG. 7). As a result, after the time t72, the hybrid vehicle 2 moves to the target position in the EV mode. Since the hybrid vehicle 2 moves in the EV mode, the SOC decreases gradually after the time t72. Here, an amount of the electric power consumed by an electric component of the hybrid vehicle 2 increases at a time t73. Thus, the SOC decreases more rapidly after the time t73 than before the time t73. Namely, as illustrated by a thick solid line in FIG. 7, the SOC decreases more rapidly after the time t73 than the SOC estimated at the time t71 (see a thick dashed line in FIG. 7). As a result, the SOC is smaller than the threshold value TH#3 (=the threshold value TH#1+the consumed electric power amount ΔSOC') at a time t74. In this case, the charge controlling unit 144 starts the control for temporarily stopping the hybrid vehicle 2 at the time t74, and as a result, the hybrid vehicle 2 temporarily stops (namely, the speed of the hybrid vehicle 2 becomes zero and the driving shaft 114 is fixed) at a time t75. In this case, the engine 111 is started at the time t75. Moreover, the motor generator 112 starts to be driven as the power generator by using the driving power of the engine 111 at a timing (a time t76 in an example illustrated in FIG. 7) after the engine 111 is started at the time t75 and before the hybrid vehicle 2 restarts to move. As a result, after the time t76, the SOC increases as the battery 116 is charged. Then, the charge controlling unit 144 starts the control for allowing the hybrid vehicle 2 to restart to move at a time t77 at which the output of the engine 111 is in the predetermined stable state. As a result, after the time t77, the speed of the hybrid vehicle 2 increases. Then, the hybrid vehicle 2 reaches the target position at a time t78.

(3) Hybrid Vehicle 3 in Third Embodiment

Next, a hybrid vehicle 3 in a third embodiment will be described.

(3-1) Structure of Hybrid Vehicle 3

Firstly, with reference to a block diagram illustrated in FIG. 8, the structure of the hybrid vehicle 3 in the third embodiment will be explained. Note that a detailed description of a component that is same as the component of the hybrid vehicle 1 in the first embodiment will be omitted by assigning same reference sign to the component.

As illustrated in FIG. 8, the hybrid vehicle 3 in the third embodiment is different from the hybrid vehicle 1 in the first embodiment in that the hybrid vehicle 3 furthermore has a seating sensor 31. The seating sensor 31 is a sensor that is configured detect whether or not a person is on a seat of the hybrid vehicle 3. The detection result of the seating sensor 31 is outputted to the ECU 14.

(3-2) Flow of Parking Assist Operation in Third Embodiment

Next, with reference to a flowchart illustrated in FIG. 9, a flow of the parking assist operation in the third embodiment will be described below. Note that a detailed description of a process that is same as the process in the above described parking assist operation in the first embodiment to the above described parking assist operation in the second embodiment will be omitted by assigning same step number to the process.

As illustrated in FIG. 9, even in the third embodiment, the processes from the step S121 to the step S124 are performed if it is determined that the user does not request the parking assist operation to be performed (the step S101: No). Especially in the third embodiment, if it is determined that the user requests the parking assist operation to be performed (the step S101: Yes), the charge controlling unit 144 determines whether or not the person is in the hybrid vehicle 3 (a step S301). The charge controlling unit 144 determines on the basis of the detection result of the seating sensor 31 whether or not the person is in the hybrid vehicle 3. Specifically, if the detection result of the seating sensor 31 indicates that the person sits on the seat of the hybrid vehicle 3, the charge controlling unit 144 determines that the person is in the hybrid vehicle 3.

As a result of the determination at the step S301, if it is determined that the person is not in the hybrid vehicle 3 (the step S301: No), the charge controlling unit 144 turns off an electric component that bears no direct relation to the moving of the hybrid vehicle 3 among electric components of the hybrid vehicle 3 (a step S302). Each of an electric component related to air conditioning (for example, an air conditioning component), an electric component related to audio (for example, a player, an amplifier and the like) and an electric component related to an eyesight (for example, a wiper, a defroster and the like) is one example of the electric component that bears no direct relation to the moving of the hybrid vehicle 3, for example. On the other hand, as a result of the determination at the step S301, if it is determined that the person is in the hybrid vehicle 3 (the step S301: Yes), the charge controlling unit 144 may not turn off the electric component.

Then, even in the third embodiment, the processes from the step S102 to the step S113 and the step S201 to the step S207 are performed, as with the second embodiment.

As described above, the effect that is same as the effect achieved by the second embodiment can be also achieved by the third embodiment. Moreover, in the third embodiment, the electric component is turned off before the consumed electric power amount ΔSOC is estimated. Thus, the charge controlling unit 144 is capable of estimating the consumed electric power amount ΔSOC without considering an amount of the electric power consumed by the electric component. Therefore, an accuracy of estimating the consumed electric power amount ΔSOC (furthermore, consumed electric power amount ΔSOC') improves in the third embodiment, because the amount of the electric power consumed by the electric component varies easily (and as a result, it is difficult to estimate the amount of the electric power consumed by the electric component with high accuracy).

Note that the charge controlling unit 144 may turn off the electric component that bears no direct relation to the moving of the hybrid vehicle 3, when the person is in the hybrid vehicle 3. However, in this case, the charge controlling unit 144 may inform the person of turning off the electric component in advance by using a display, a speaker or the like, in order to eliminate uneasy feeling of the person caused by the electric component being suddenly turned off.

Moreover, the operation of determining on the basis of the determination result of the seating sensor 31 whether or not the person is in the hybrid vehicle 3 is one example of the operation of determining whether or not the person is in the hybrid vehicle 3. Therefore, the charge controlling unit 144 may determine whether or not the person is in the hybrid vehicle 3 by using any method. For example, if the hybrid vehicle 3 has any sensor that is configured to detect the person in a cabin of the hybrid vehicle 3, the charge controlling unit 144 may determine on the basis of the determination result of this sensor whether or not the person is in the hybrid vehicle 3.

Moreover, in the third embodiment, the processes from the step S201 to the step S207 may not be performed. Namely, the processes from the step S301 to the step S302 in the third embodiment may be combined with the parking assist operation in the first embodiment.

At least one portion of the feature in the above described embodiments may be eliminated or modified accordingly. At least one portion of the feature in one of the above described embodiments may be combined with another one of the above described embodiments.

This application is based upon and claims the benefit of priority of the prior Japanese Patent Application No. 2016-214934, filed on Nov. 2, 2016, the entire contents of which are incorporated herein by reference. In addition, the entire contents of the above described Patent Literatures 1 to 2 are incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. A vehicle control apparatus, which involve such changes, are also intended to be within the technical scope of the present invention.

REFERENCE SIGNS LIST

1, 2, 3 hybrid vehicle
111 engine
112 motor generator
113 transaxle
114 driving shaft
115 driving wheel
116 battery
117 SOC sensor
13 camera
14 ECU
141 periphery recognizing unit
142 rouge generating unit
143 parking assisting unit
144 charge controlling unit
151 brake actuator
152 brake apparatus
153 steering actuator
154 turned wheel
31 seating sensor
TH#0, TH#1, TH#2 threshold value
ΔSOC, ΔSOC$_{ACT}$ consumed electric power amount

The invention claimed is:

1. A vehicle control apparatus that is configured to control a hybrid vehicle, the hybrid vehicle having an engine and a rotating electrical machine each of which is connected to a driving shaft and each of which is a source of driving power, the rotating electrical machine being capable of being driven by using an output of the engine to charge an electric power storage, the vehicle control apparatus comprising a controller, the controller being programmed to: perform a parking assist operation for automatically parking the hybrid vehicle at a target position; and perform a first control operation, the first control operation allowing the engine to stop, if an amount of the stored electric power in the electric power storage is larger than a first threshold value corresponding to an amount of the electric power at which the electric power storage needs to be charged, and the first control operation charging the electric power storage by driving the rotating electrical machine by using the output of the engine, if the amount of the stored electric power is smaller than the first threshold value, the controller being programmed to: perform a second control operation instead of the first control operation during a first period from an assist start time at which the parking assist operation is requested to be performed to an assist completion time at which the parking assist operation completes the parking of the hybrid vehicle at the target position, and perform the first control operation without performing the second control operation during a second period other than the first period, the second control operation putting the engine into a stopping state before a moving start time at which the parking assist operation starts to move the hybrid vehicle and forbidding the engine from being started after the moving start time, if the amount of the stored electric power at a timing before the moving start time is larger than a second threshold value corresponding to an amount of the electric power that is capable of completing the parking of the hybrid vehicle at the target position with the engine being kept in the stopping state, and the second control operation putting the engine into a driving state before the moving start time and forbidding the engine from stopping after the moving start time, if the amount of the stored electric power at the timing before the moving start time is smaller than the second threshold value.

2. The vehicle control apparatus according to claim 1, wherein
the controller is programmed to estimate, before the moving start time, an amount of the electric power consumed by the hybrid vehicle before completing the parking of the hybrid vehicle at the target position with the engine being kept in the stopping state, and to set the second threshold value on the basis of the estimated amount of the electric power.

3. The vehicle control apparatus according to claim 2, wherein
the controller is programmed to stop one portion of an electric component of the hybrid vehicle that bears no direct relation to the moving of the hybrid vehicle, before estimating the amount of the electric power.

4. The vehicle control apparatus according to claim 1, wherein
the controller is programmed to temporarily stop the hybrid vehicle to allow the engine to be started during a period when the hybrid vehicle temporarily stops, if the amount of the stored electric power at a predetermined time after the moving start time is smaller than a third threshold value corresponding to an amount of the electric power that is capable of completing the parking of the hybrid vehicle at the predetermined time at the target position when the start of the engine is forbidden.

5. The vehicle control apparatus according to claim 4, wherein
the controller is programmed to allow the hybrid vehicle to move after the engine is started during the period when the hybrid vehicle temporarily stops and then the output of the engine is in a predetermined stable state.

* * * * *